Patented Mar. 7, 1944

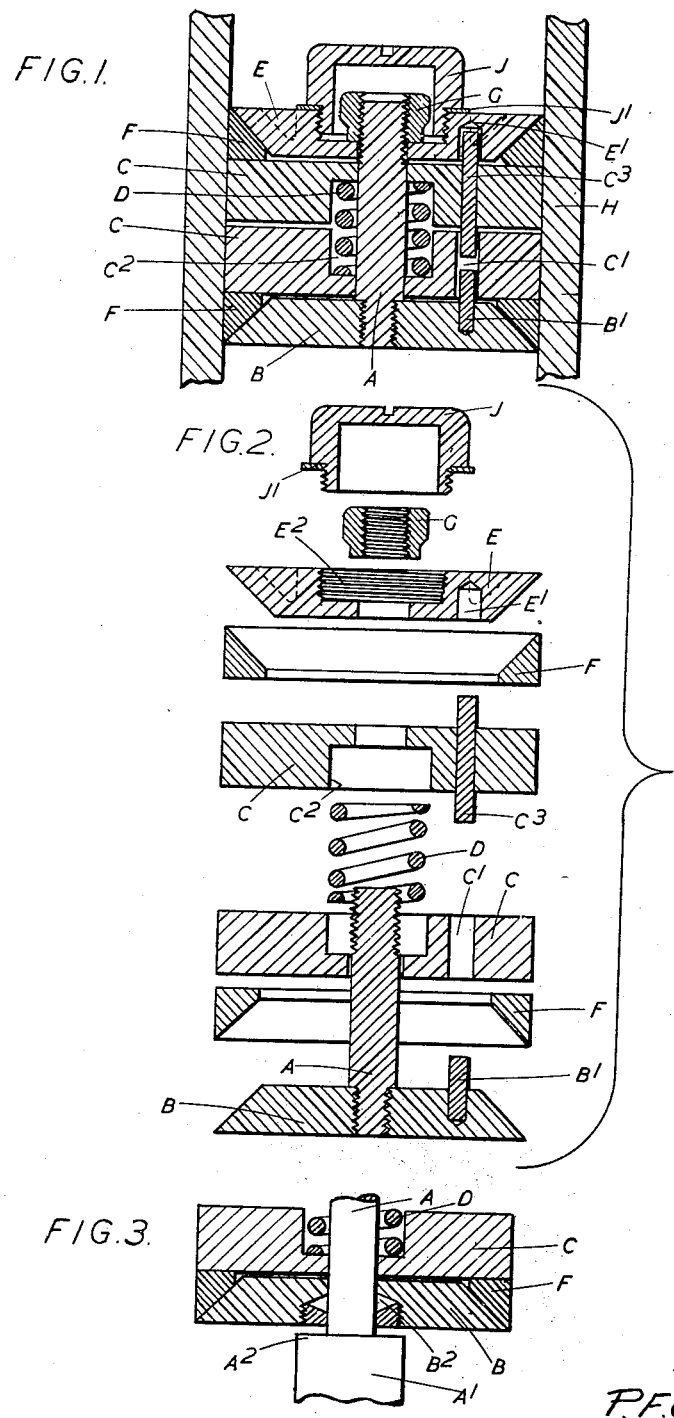

2,343,751

UNITED STATES PATENT OFFICE 2,343,751

PISTON

Paul Faulkner Crothers, London, England, assignor to Trier Bros. Limited, London, England, a company of Great Britain Application March 4, 1943, Serial No. 478,036
In Great Britain April 7, 1942

9 Claims. (Cl. 309—4)

This invention relates to plungers or pistons and in particular to plungers of the floating type for use in cylinders in which they are exposed to fluid pressure. The object of the invention is to provide a plunger of simple construction which will be fluid-tight in spite of variations in the load to which it is exposed.

According to this invention a plunger or piston comprises a rod or spindle, a pair of discs or piston members mounted to slide on the rod, a spreader at each end of the rod, a piston ring between the outer face of each disc and its spreader, and a spring normally pressing the discs away from one another and towards their respective spreaders. One of the spreaders is free to slide towards the other on the rod against the action of the spring if the load to which the spreader is exposed exceeds that exerted by the spring and the spring is conveniently housed in a central recess formed in the inner face of each piston member so that the spring occupies an annular chamber surrounding the rod.

The circumferential surface of each spreader is so inclined that when the distance between the spreader and the face of the adjacent disc is reduced, the diameter of the piston ring between these parts is progressively increased. Further, the inclined surface of the spreader is preferably at a less acute angle to the face of the plunger than that of the ring with which it is brought into contact, so that, initially, these two inclined surfaces are in contact only at their outer circumference, thus ensuring the radial expansion of the ring as the distance between the spreader and the distance piece is reduced.

At least one of the spreaders may have a projection adapted to engage a stop at the end of each stroke and to limit the movement of the plunger, but this does not cause any interference with the action of the spring unless and until the pressure on the face of the spreader exceeds that exerted by the spring, when the spring will be compressed thus decreasing the distance between the spreaders and so causing the piston rings to be expanded in a radial direction.

One construction of plunger according to the present invention is shown by way of example in the accompanying drawing, in which Figure 1 shows in vertical section the parts assembled within a cylinder, Figure 2 illustrates in sectional elevation the individual parts of the plunger separate but ready for assembly, and Figure 3 shows the lower end of a modified form of plunger with a connecting rod.

The plunger comprises a central rod A the lower end of which is secured to a disc-like base B of which the edge or circumferential periphery is inclined to form a spreader. Mounted to slide on the rod are two similar piston members C comprising discs each having on its inner face a central recess $C^2$ to form an annular housing for a coil spring D surrounding the rod and normally pressing the discs apart. The upper disc or piston member C is provided with a projecting dowel pin $C^3$ which engages an opening $C^1$ in the lower disc to facilitate assembly and the upper end of a dowel pin $B^1$ also engages the bore $C^1$.

A second spreader E is mounted on the upper screwthreaded end of the rod A and in the underside of the spreader is an opening $E^1$ to receive the upper end of the dowel pin $C^3$. The upper surface of the spreader E is provided with an internally screwthreaded recess $E^2$ surrounding the opening through which the rod extends, and this spreader E can move and slide on the rod towards or away from the lower spreader B, being normally pressed upwards by means of the spring D.

Interposed between the flat outer faces of the discs or piston members C and the inner faces of the spreaders are similar piston rings F formed of resilient material, and the inclined surface of each spreader initially forms a less acute angle to the face of the piston member than that of the piston ring F. Hence when the parts are first assembled on the rod, only the outer edge of the inclined surface of each spreader makes contact with the corresponding edge of the inclined face of the piston ring. The material from which the rings F are formed may vary to suit the duty the plunger is designed to fulfill, for example synthetic rubber may be used when the plunger forms part of an apparatus for conveying lubricant, but leather, sponge metal or other known packing materials may be employed where the conditions are suitable.

The parts are held together by means of a nut G which engages the upper screwthreaded end of the rod, and when the parts are loosely assembled and the nut has been placed in position they are inserted in the cylinder H in which the plunger is to be used. By means of a suitable spanner the nut G is then tightened until the spring D is so loaded that the piston rings F are sufficiently expanded, in which position there is a short space between the adjacent inner surfaces of the piston discs C as shown in Figure 1. A hollow nut or cap J carrying a fibre or like washer $J^1$ is then screwed home into the recess $E^2$ formed in the upper spreader so as to make a fluid-tight joint with the upper spreader E and prevent pressure within the cylinder acting on the under face of the spreader.

The upper end of the cap further forms a stop to limit the upward movement of the plunger in its cylinder, and if desired the lower spreader may have a similar projection or the face of this spreader may engage a projection in the lower end of the cylinder to limit the downward movement of the plunger.

Normally the spreaders B and E are pressed against their respective piston rings F by means of the spring D which continues to exert a controlled pressure upon them whether the plunger is stationary or in movement and also when the plunger is at the end of its stroke and in contact with a positive stop. Should however the pressure acting upon either end of the plunger exceed that exerted by the spring D, the latter is further compressed so that the piston rings F are additionally expanded to prevent any leakage which might otherwise occur past the plunger. Thus, irrespective of variations in load, the spreaders are caused to maintain the piston rings so as to prevent the passage of fluid past the plunger.

The lower spreader B is preferably secured to the rod in the manner illustrated although other ways of forming the connection will doubtless suggest themselves to those familiar with the subject provided the construction adopted prevents fluid from penetrating between the spreader and the rod and thus from acting on the inner faces of the spreaders.

Figure 3 shows the lower end of a piston, similar in all other respects to that already described, having a connecting rod $A^1$ which is integral with but of larger diameter than the rod A which carries the spreaders and piston discs. As any sudden withdrawal of the connecting rod, for example by means of a crank, might counteract pressure of the spring D, the part of the rod which is of smaller diameter is adapted to pass freely through a gland $B^2$ in the lower spreader B without creating fluid pressure under the plunger. In normal conditions the spring D will maintain the lower spreader in contact with the shoulder $A^2$ of the connecting rod although in the drawing a small clearance is shown.

It will be understood that the invention is not limited to a plunger of the floating type and that not only can the load on the spring be adjusted by means of the nut in the manner already described, but obviously interchangeable springs of different strengths may be employed and the plunger will operate successfully whether it is exposed to variations in positive or negative pressure.

What I claim as my invention and desire to secure by Letters Patent is:

1. A plunger comprising a rod, a pair of discs mounted to slide on the rod, a spreader at each end of the rod, each forming an end face of the plunger, a piston ring between the outer face of each disc and its spreader, and a spring normally tending to press each disc towards its respective spreader and to maintain the spreaders away from one another.

2. A plunger as claimed in claim 1 in which one of the spreaders is free to slide towards the other on the rod against the action of the spring if the load to which the spreader is exposed exceeds that exerted by the spring.

3. A plunger comprising a rod, an adjacent pair of discs each having a recess in its inner face mounted to slide on the rod, a spreader at each end of the rod, a piston ring between the outer face of each disc and its spreader and a spring housed in the annular space formed by the recesses in the discs normally pressing said discs away from one another and towards their respective spreaders.

4. A plunger as claimed in claim 1 in which the circumferential surface of each spreader is so inclined that when the distance between the spreader and the face of the adjacent disc is reduced the diameter of the piston ring between these parts is progressively increased.

5. A plunger as claimed in claim 1 in which the inclined surface of the spreader is at a less acute angle to the face of the plunger than that of the piston ring with which it cooperates so that initially these two inclined surfaces are in contact only at their outer circumference.

6. A plunger as claimed in claim 1 in which at least one of the spreaders has a projection adapted to limit the stroke of the plunger.

7. A plunger comprising a rod, a pair of discs mounted to slide on the rod, a spreader at each end of the rod, one of which is free to slide towards the other on the rod, a piston ring between the outer face of each disc and its spreader, a spring normally tending to press the discs away from one another and towards their respective spreaders and a cap enclosing in a fluid-tight manner the end of the rod which projects through one of the spreaders.

8. A piston as claimed in claim 1, in which the component members are mounted on a connecting rod, and a gland on at least one of the spreaders through which the rod can slide for a limited distance without counteracting the pressure of the spring.

9. A plunger comprising a rod, a pair of discs mounted to slide on the rod, a spreader at each end of the rod at least one of which is free to slide towards the other on the rod, a piston ring between the outer face of each disc and its spreader, and a spring normally tending to press the discs away from one another and towards their respective spreaders.

PAUL FAULKNER CROTHERS.